United States Patent
Hardie et al.

(10) Patent No.: US 6,675,340 B1
(45) Date of Patent: Jan. 6, 2004

(54) FORWARD ERROR CORRECTION (FEC) FOR PACKETIZED DATA NETWORKS

(75) Inventors: Terry Hardie, Newark, CA (US); Tony Hardie, Newark, CA (US); Jeffrey Sean Connell, Fremont, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 432 days.

(21) Appl. No.: 09/693,788

(22) Filed: Oct. 19, 2000

(51) Int. Cl.$^7$ .......................... H03M 13/00; H04L 1/18
(52) U.S. Cl. ........................ 714/751; 714/776
(58) Field of Search .................. 714/776, 751

(56) References Cited

U.S. PATENT DOCUMENTS

| | | | |
|---|---|---|---|
| 5,870,412 A | * 2/1999 | Schuster et al. | 714/752 |
| 6,141,788 A |  10/2000 | Rosenberge et al. | |
| 6,243,846 B1 | * 6/2001 | Schuster et al. | 714/776 |
| 6,289,054 B1 | * 9/2001 | Rhee | 375/240.27 |
| 6,445,717 B1 | * 9/2002 | Gibson et al. | 370/473 |

OTHER PUBLICATIONS

Li et al. (Chung–Sheng Li and C.J. Georgiou; Implementation and performance analysis of congestion–tolerant isochronous communication in ATM networks using diversified routing; Conference Record IEEE International Conference on Communications Serving Human.*

* cited by examiner

Primary Examiner—David Ton
Assistant Examiner—Joseph D. Torres
(74) Attorney, Agent, or Firm—Townsend and Townsend and Crew LLP (57) ABSTRACT

A system and method for using forward error correction (FEC) to improve transmission reliability for data packets transmitted over packetized data networks, such as voice packets transmitted over an Internet Protocol (IP) network is disclosed. Packets containing error data are transmitted separately from corresponding voice packets. The error packets are transmitted a predetermined number of frames before the voice packets, to increase the probability that either the voice packet or error packet will be received. The error packets are preferably created using a Reed-Solomon algorithmn. The amount of error correction transmitted may be adaptively adjusted based on the reliability of the network connection.

24 Claims, 10 Drawing Sheets

| Reliability | Loss | Ecc Window Size | Latency (ms) 15ms sample rate | Additional Bandwidth needed |
|---|---|---|---|---|
| 100% | 0% | 0 | 0 | 0% |
| 98% | 2% | 50 | 750 | 2% |
| 96% | 4% | 25 | 375 | 4% |
| 94% | 6% | 17 | 255 | 6% |
| 92% | 8% | 13 | 195 | 8% |
| 90% | 10% | 10 | 150 | 10% |
| 88% | 12% | 9 | 135 | 12% |
| 86% | 14% | 8 | 120 | 14% |
| 84% | 16% | 7 | 105 | 16% |
| 82% | 18% | 6 | 90 | 18% |
| 80% | 20% | 5 | 75 | 20% |
| 78% | 22% | 5 | 75 | 22% |
| 76% | 24% | 5 | 75 | 24% |
| 74% | 26% | 4 | 60 | 26% |
| 72% | 28% | 4 | 60 | 28% |
| 70% | 30% | 4 | 60 | 30% |
| 68% | 32% | 4 | 60 | 32% |
| 66% | 34% | 3 | 45 | 34% |
| 64% | 36% | 3 | 45 | 36% |
| 62% | 38% | 3 | 45 | 38% |
| 60% | 40% | 3 | 45 | 40% |
| 58% | 42% | 3 | 45 | 42% |
| 56% | 44% | 3 | 45 | 44% |
| 54% | 46% | 3 | 45 | 46% |
| 52% | 48% | 3 | 45 | 48% |
| 50% | 50% | 2 | 30 | 50% |

*FIG. 13*

FORWARD ERROR CORRECTION (FEC) FOR PACKETIZED DATA NETWORKS

This application is related to U.S. patent application Ser. No. 09/693,782, entitled "SYSTEM AND METHOD FOR FRAME PACKING", filed Oct. 19, 2000, assigned to the assignee of the present application, and herein incorporated by reference.

BACKGROUND OF THE INVENTION

1. Field of the Invention

The present invention relates generally to the field of packetized data transmission, and more particularly, to a system and method for forward error correction (FEC) for packetized data networks, such as a Voice-over-IP (VoIP) network.

2. Description of the Related Art

Figure 1:
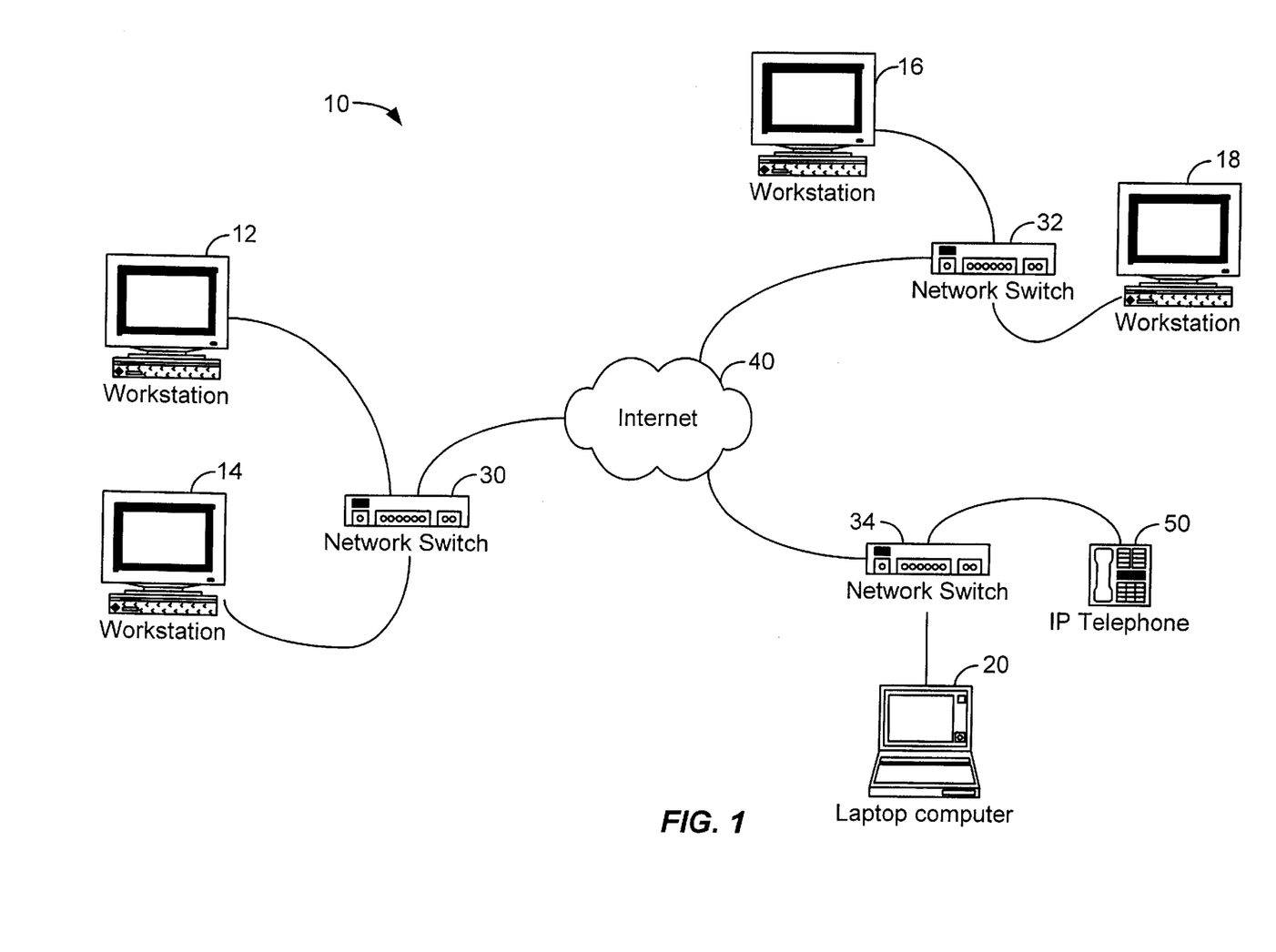
FIG. 1 illustrates a typical Voice-over-IP network.

A typical communications network 10 is shown in FIG. 1. Individual computers 12, 14, 16, 18, 20 are connected via a network interface 30, 32, 34 to a network, such as the Internet 40. The network 10 forwards and routes data sent from a source computer to a destination computer. Increasingly, such networks are also used to transmit voice signals, as well as data. In fact, digital telephones 50 may be connected directly to the network 10, as shown in the Figure. However, since such networks were originally designed to transmit data, and not necessarily in real-time, there are many problems associated with transmitting voice conversations between two parties.

In packetized voice communication systems (e.g. Voice-over-IP (VoIP), frame relay, or ATM), voice data is digitized and lossily compressed into frames. Each frame represents the voice data for a small unit of time, typically 30 milliseconds. Frames are then transported over the network from a source to a destination, where the frames are then decompressed.

Figure 2:
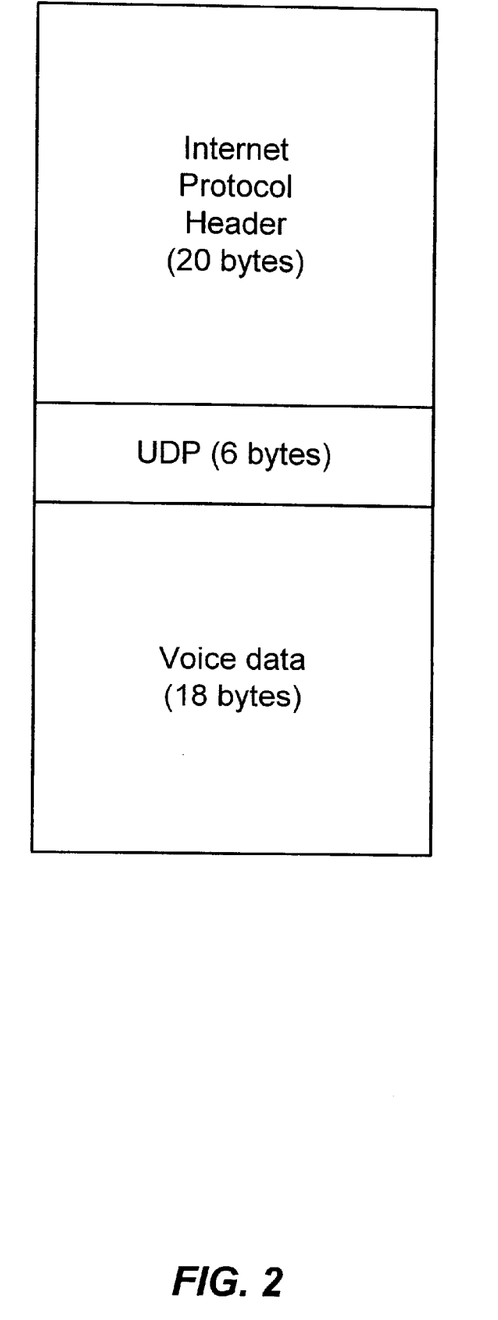
FIG. 2 illustrates a typical EP voice packet.

In a Voice-over-IP (VoIP) network, each frame of voice data is typically encapsulated in one datagram. The Internet Protocol (IP) imposes a minimum of 20 bytes of header, containing such information as the destination EP address. The User Datagram Protocol (UDP), typically used for voice transport applications, adds another six bytes of header information. A voice frame encoded with, for example, the Lucent 9600 codec is 18 bytes long. (FIG. 2).

It is the responsibility of the underlying network protocols to ensure that the packets are received at the receiving end. Occasionally, however, packets may be lost or corrupted. In a protocol such as TCP running over EP, if a packet is missing, it is the responsibility of the TCP layer to ask for retransmission of the packet, thus ensuring data integrity. However, in a VoIP network, the compressed voice packets are time critical, and if a packet is lost there is not time to request a retransmission of the packet. This may result in the voice sounding "broken-up."

Figure 3:
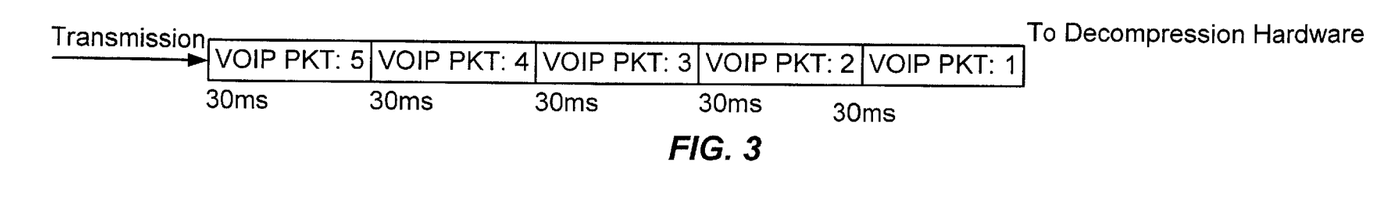
FIG. 3 is a diagram of a prior art receiving queue buffer.
Figure 4:
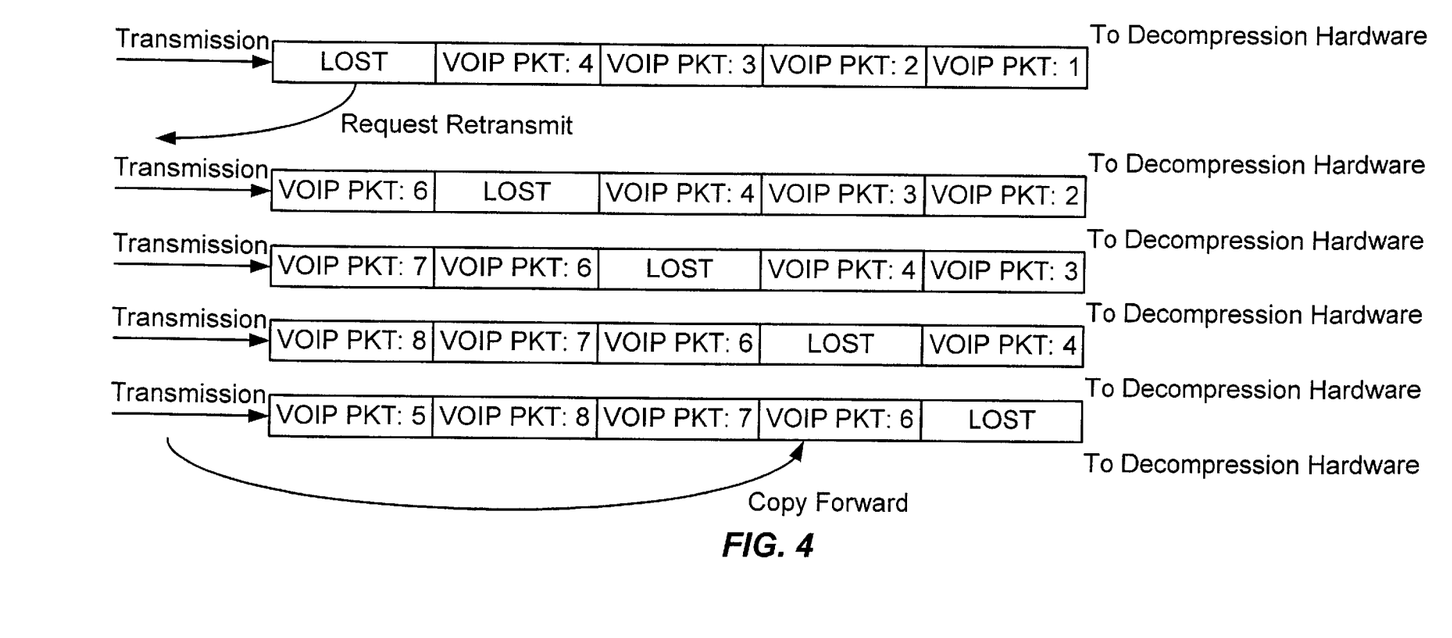
FIG. 4 illustrates the operation of a prior art receiving queue buffer with packet retransmission.

One common method to overcome this problem is to use a buffer which stores a certain number of packets in a queue. If a packet is missing, its retransmission can be requested and the packet received before the packets are decompressed. Packets can then be rearranged to ensure that they are in the correct order. However, this produces unacceptably long latencies as a result of the extra retransmission time and buffer delay. For example, in FIG. 3, the total latency for the receive queue is 150 ms. For this method to work, the queue length needs to be sufficiently long to account for the retransmission latency. Assuming a retransmission latency of 120 ms, as shown in FIG. 4, a lost packet can be recovered before the packet is sent to the decompression hardware. In reality, the retransmission latencies are much greater than 120 ms, and this approach thus becomes unacceptable.

Alternatively, each packet may be transmitted two or three times, but this is an inefficient use of bandwidth. Thus, it would be desirable to have an improved error correction technique that could be used with VoIP systems, without introducing large latencies and without significantly increasing the required bandwidth.

SUMMARY OF THE INVENTION

In general, the present invention is a system and method for using forward error correction (FEC) to improve transmission reliability for data packets transmitted on a packetized data network, such as an Internet Protocol (EP) network. Packets containing error data are transmitted separately from corresponding voice packets. The error packets are transmitted a predetermined number of packets before the voice packets, to increase the probability that either the voice packet or error packet will be received. The error packets are preferably created using a Reed-Solomon algorithm. This approach greatly reduces the amount of error data that needs to be transmitted, without substantially increasing latency.

Additionally, the present invention may be further enhanced by dynamically adapting the amount of error correction that is sent based upon the "reliability" of a network connection. In another embodiment, voice frames and error frames from different conversations are packed at a same time interval to increase transmission efficiency.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a system and method for forward error correction (FEC) for packetized data networks. Any and all such modifications, equivalents and alternatives are intended to fall within the spirit and scope of the present invention.

In order to overcome transmission errors and packet loss, many systems use forward error correction (FEC). In general, FEC schemes transmit extra data which can be used at the receiving end to re-create any corrupted or lost packets. FEC has been applied to CD-ROMs to compensate for scratches, and used in satellite and deep-space transmissions, since the broadcast is in only one direction (i.e. the receiver is incapable of asking for retransmission). See, for example, *Error Coding Cookbook: Practical C/C++ Routines and Recipes for Error Detection and Correction*, by C. Britton Rorabaugh, herein incorporated by reference.

Many of these systems use the Reed-Solomon algorithm, which is primarily designed to take an arbitrary stream of data and restore any corrupted section therein, with the appropriate amount of error correction contained in the stream. In order for the algorithm to recover data that has been corrupted or lost in an arbitrary location, the algorithm must include enough error correction to compensate for the fact that some error correction may not be received at the receiving end as well (i.e. the algorithm needs to be able to account for the fact that both data and error correction may be lost). As a result, applying Reed-Solomon in some cases can actually double the amount of data that is transmitted.

In packetized data transmission systems, the data loss is not a random length, i.e. a fixed number of packets are either lost or corrupted. In other words, the data stream is not interrupted at some random location for a random interval, but the interruption is much more predictable. Since the actual data transmission is handled at lower layers (routers, etc.), the only time that a transmission will lose data is if the router does not have enough bandwidth or enough processor time to forward an entire packet. So, from a sender's point of view, an error correction technique only needs to be able to correct a packet in its entirety (not a partial packet). It also follows from this reasoning that the error correction data should not be transmitted in the same packet as the voice data.

Note that while the present invention will be described herein specifically with reference to a Voice-over-IP network, the present invention may be advantageously applied to any network that utilizes packets to transmit frames of data, in order to reduce the amount of error correction data that needs to be transmitted.

The present invention utilizes the fact that if one knows the type of data loss ahead of time (i.e. discrete packet loss), then the amount of overhead and amount of error correction associated with the Reed-Solomon algorithm can be reduced. According to the present invention, for each packet of voice data that is transmitted, error correction data is generated and transmitted in pieces over a predetermined number of packets prior to the voice packet itself. At the receiving end, what generally arrives is several error packets, and then a voice packet. In the present invention, since an error correction packets are separate from the voice packets, this helps ensure that one or the other will be received. Also, additional error correction data can be generated to account for multiple packets getting lost in a row—limited by the bandwidth of the network. The present invention is designed to be able to adjust the above settings to account for more or less packet loss.

In further detail, the present invention employs a type of Forward Error Correction (FEC) right at the packet level. This enables the reconstruction of whole packets instead of single bit errors, which may occur at lower levels. Consider the following assumptions:

1. All packets received are 100% correct with regard to data integrity.
2. It is possible for packets not arrive at all (loss).
3. It is possible a packet will arrive late.
4. It is possible packets will arrive in an incorrect order (may be viewed as a combination of 2 & 3).
5. Duplicate packets are possible.

The present invention reliably compensates for the above anomalies, resulting in clear and consistent voice signals, with respect to a reasonable amount of packet loss.

FEC Basics

Figure 5:
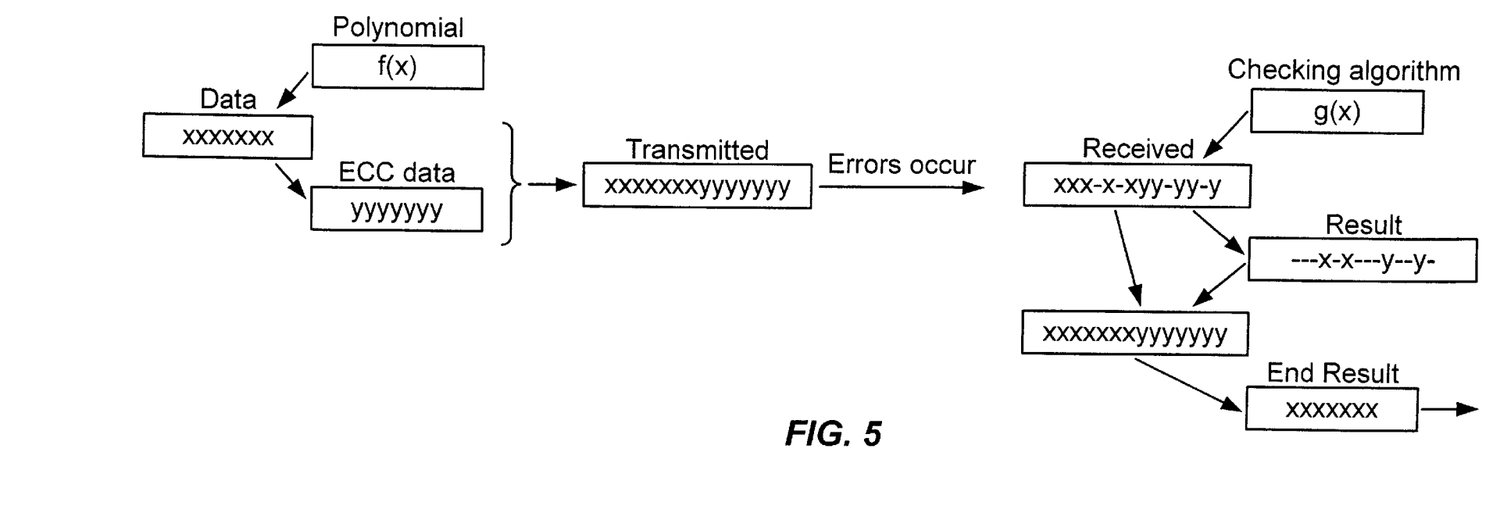
FIG. 5 illustrates the operation of forward error correction (FEC)

FEC can be viewed as an advanced form of checksums. A set mathematical (polynomials) equations are applied to input data resulting in another set of data. The output data is called Error Correcting Code data (ECC data). Both sets of data are then transmitted. Upon reception, the data is checked for integrity using the ECC data and the known polynomials, resulting in another piece of data indicating exactly where and how the received data is incorrect and how to correct it. Note that the checking algorithm can detect discrepancies in the ECC data itself, even if it was corrupted. This process is illustrated graphically in FIG. 5.

In general, the set of mathematical algorithms and equations used to calculate the ECC data is called "Reed-Solomon", and is well known in the art, but for background, will now be described below.

Reed Solomon Codes

Reed Solomon codes are a subset of BCH codes and are linear block codes. A Reed-Solomon code is specified as RS(n,k) with s-bit symbols. This means that the encoder takes k data symbols of s bits each and adds parity symbols to make an n symbol codeword. There are n–k parity symbols of s bits each. A Reed-Solomon decoder can correct up to t symbols that contain errors in a codeword, where 2t=n–k. In reality, a Reed-Solomon decoder can correct up to 2t symbols if the locations of the errors are already known, which is an important feature utilized in the present implementation.

Figure 6:
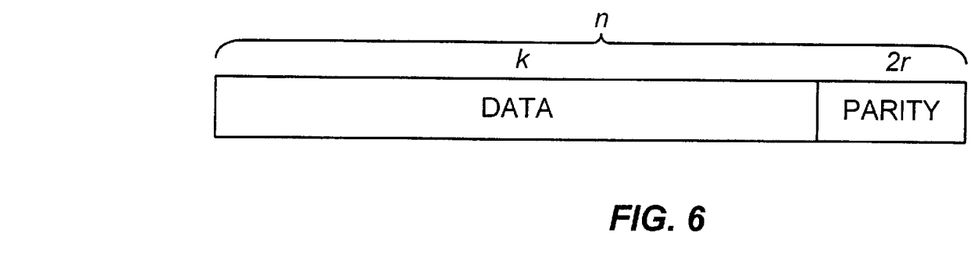
FIG. 6 is a diagram of a typical Reed-Solomon codeword.

FIG. 6 illustrates a typical Reed-Solomon codeword (known as a Systematic code because the data is left unchanged and the parity symbols are appended).

EXAMPLE 1

One popular Reed-Solomon code is RS(255,223) having 8-bit symbols. Each codeword contains 255 code word bytes, of which 223 bytes are data and 32 bytes are parity.

For this code:

n=255, k=223, s=8, 2t=32, t=16

The decoder can correct any 16-symbol errors in the code word: i.e. errors in up to 16 bytes anywhere in the codeword can be automatically corrected.

Given a symbol size s, the maximum codeword length (n) for a Reed-Solomon code is:

n=2s−1. For example, the maximum length of a code with 8-bit symbols (s=8) is 255 bytes.

Reed-Solomon codes may be shortened by (conceptually) making a number of data symbols zero at the encoder, not transmitting them, and then re-inserting them at the decoder.

EXAMPLE 2

The RS(255,223) code described above can be shortened to (200,168). The encoder takes a block of 168 data bytes, and (conceptually) adds 55 zero bytes, creates a (255,223) codeword and transmits only the 168 data bytes and 32 parity bytes.

The amount of processing "power" required to encode and decode Reed-Solomon codes is related to the number of parity symbols per codeword. A large value of t means that a large number of errors can be corrected but requires more computational power than a small value of t. The standard implementation of Reed-Solomon has been described but since the goal of the present implementation is to recover whole packets of information, i.e. t=k, which results in making 2t a large number. However, since the error locations are known (i.e. a whole packet) the amount of ECC data actually needed according to the present invention is only k (the size of the packet itself).

Symbol Errors

One symbol error occurs when 1 bit in a symbol is wrong or when all the bits in a symbol are wrong.

EXAMPLE 3

RS(255,223) can correct 16 symbol errors. In the worst case, 16 bit errors may occur, each in a separate symbol (byte), so that the decoder corrects 16 bit errors. In the best case, 16 complete byte errors occur so that the decoder corrects 16×8 bit errors. Reed-Solomon codes are particularly well suited to correcting burst errors (where a series of bits in the codeword are received in error).

Decoding

Reed-Solomon algebraic decoding procedures can correct errors and erasures. An erasure occurs when the position of an erred symbol is known (in the present implementation erasures are the only occurrence). A decoder can correct up to t errors or up to 2t erasures. The demodulator can often supply erasure information in a digital communication system, i.e. the demodulator "flags" received symbols that are likely to contain errors.

When a codeword is decoded, there are three possible outcomes:

1. If 2s+r<2t (s errors, r erasures), then the original transmitted code word will always be recovered.
OTHERWISE
2. The decoder will detect that it cannot recover the original code word and indicate this fact.
OR
3. The decoder will mis-decode and recover an incorrect code word without any indication. The probability of each of the three possibilities depends on the particular Reed-Solomon code and on the number and distribution of errors.

Finite (Galois) Field Arithmetic

Reed-Solomon codes are based on a specialized area of mathematics known as Galois fields, or finite fields. A finite field has the property that arithmetic operations (+,−,x,/ etc.) on field elements always have a result in the field. A Reed-Solomon encoder or decoder needs to carry out these arithmetic operations. These operations generally require special hardware or software functions in order to implement them.

Generator Polynomial

A Reed-Solomon codeword is generated using a special polynomial. All valid codewords are exactly divisible by the generator polynomial. The general form of the generator polynomial is:

$$g(x)=(x-\alpha)(x-\alpha^{i+1})\ldots(x-\alpha^{i-2t})$$

and the codeword is constructed using:

$$c(x)=g(x)\cdot i(x)$$

where g(x) is the generator polynomial, i(x) is the information block, c(x) is a valid codeword and $\alpha$ is referred to as a primitive element of the field.

Example: Generator for RS(255,249)

$$g(x)=(x-\alpha^0)(x-\alpha^1)(x-\alpha^2)(x-\alpha^3)(x-\alpha^4)(x-\alpha^5)$$

$$g(x)x^6+g_5x^5+x^4+g_3x^3+g_2x^2+g_1x^1+g_0$$

Encoder Architecture

The 2t parity symbols in a systematic Reed-Solomon codeword are given by:

$$p(X)=i(x)^{n-k} \bmod g(x)$$

Figure 7:
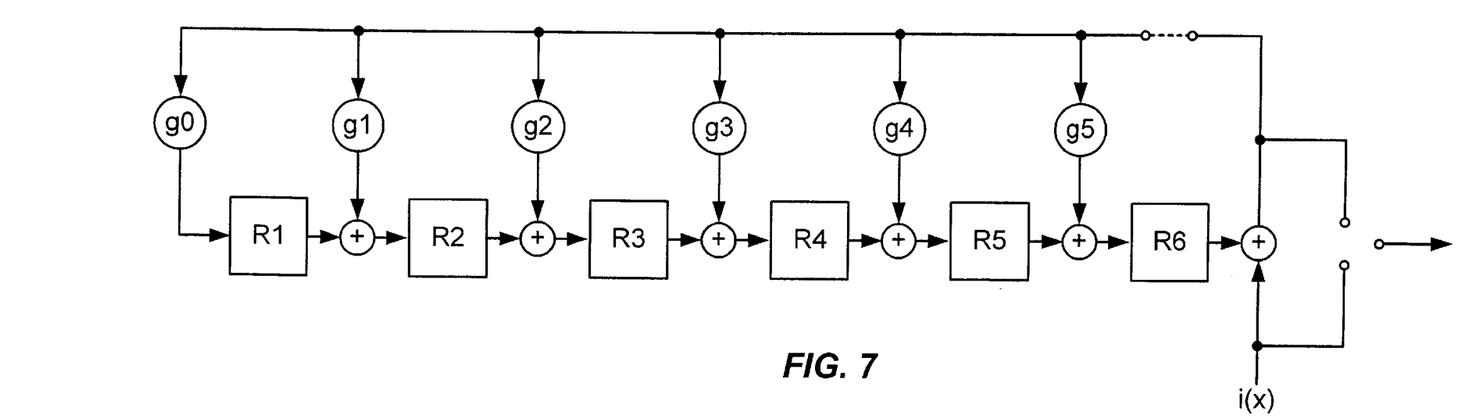
FIG. 7 is a diagram of a systematic RS(255,249) encoder.

FIG. 7 shows an architecture for a systematic RS(255,249) encoder. Each of the 6 registers R1–R6 holds a symbol (8 bits). The arithmetic operators carry out finite field addition or multiplication operations on a complete symbol.

Decoder Architecture

Figure 8:
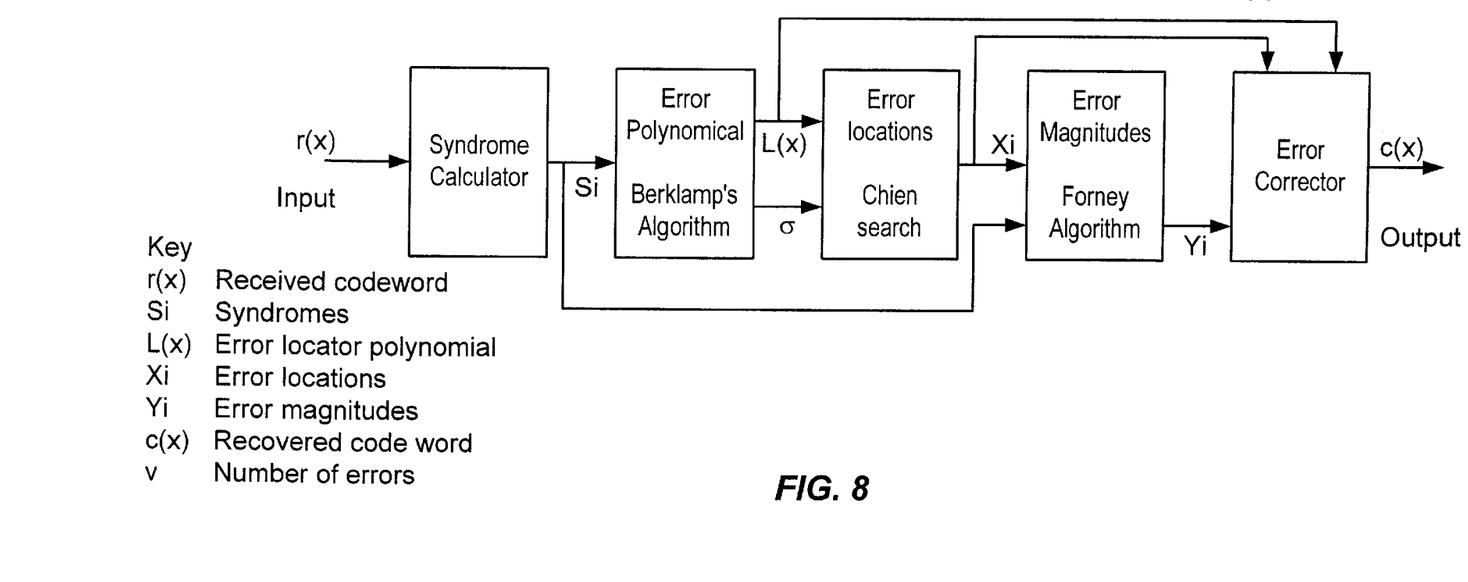
FIG. 8 is a diagram of a general Reed-Solomon decoder.

A general architecture for decoding Reed-Solomon codes is shown in FIG. 8.

Key
 r(x) Received codeword
 Si Syndromes
 L(x) Error locator polynomial
 Xi Error locations
 Yi Error magnitudes
 c(x) Recovered code word
 V Number of errors The received codeword r(x) is the original (transmitted) codeword c(x) plus errors:

$$r(x)=c(x)+e(x)$$

A Reed-Solomon decoder attempts to identify the position and magnitude of up to t errors (or 2t erasures) and to correct the errors or erasures.

Syndrome Calculation

This is a similar calculation to a parity calculation. A Reed-Solomon codeword has 2t syndromes that depend only on errors (not on the transmitted code word). The syndromes can be calculated by substituting the 2t roots of the generator polynomial g(x) into r(x).

Finding the Symbol Error Locations

Note that this explanation describes how to find the Symbol Error Locations in a general case. However, in the present implementation, the Symbol Error Locations are already known and thus regenerated. In general, finding the Symbol Error Locations involves solving simultaneous equations with t unknowns. Several fast algorithms are available to do this. These algorithms take advantage of the special matrix structure of Reed-Solomon codes and greatly reduce the computational effort required. In general, two steps are involved:

1. Find an Error Locator Polynomial

In the preferred embodiment, this is done using the Berlekamp-Massey algorithm. Euclid's algorithm could be used and is more widely used in practice because it is easier to implement. However, the Berlekamp-Massey algorithm tends to lead to more efficient hardware and software implementations.

2. Find the Roots of this Polynomial

This is done using the Chien search algorithm.

Finding the Symbol Error Values

Similarly, this operation involves solving simultaneous equations with t unknowns. A widely used fast algorithm is the Forney algorithm.

Transmitting the FEC Data

Figure 9:
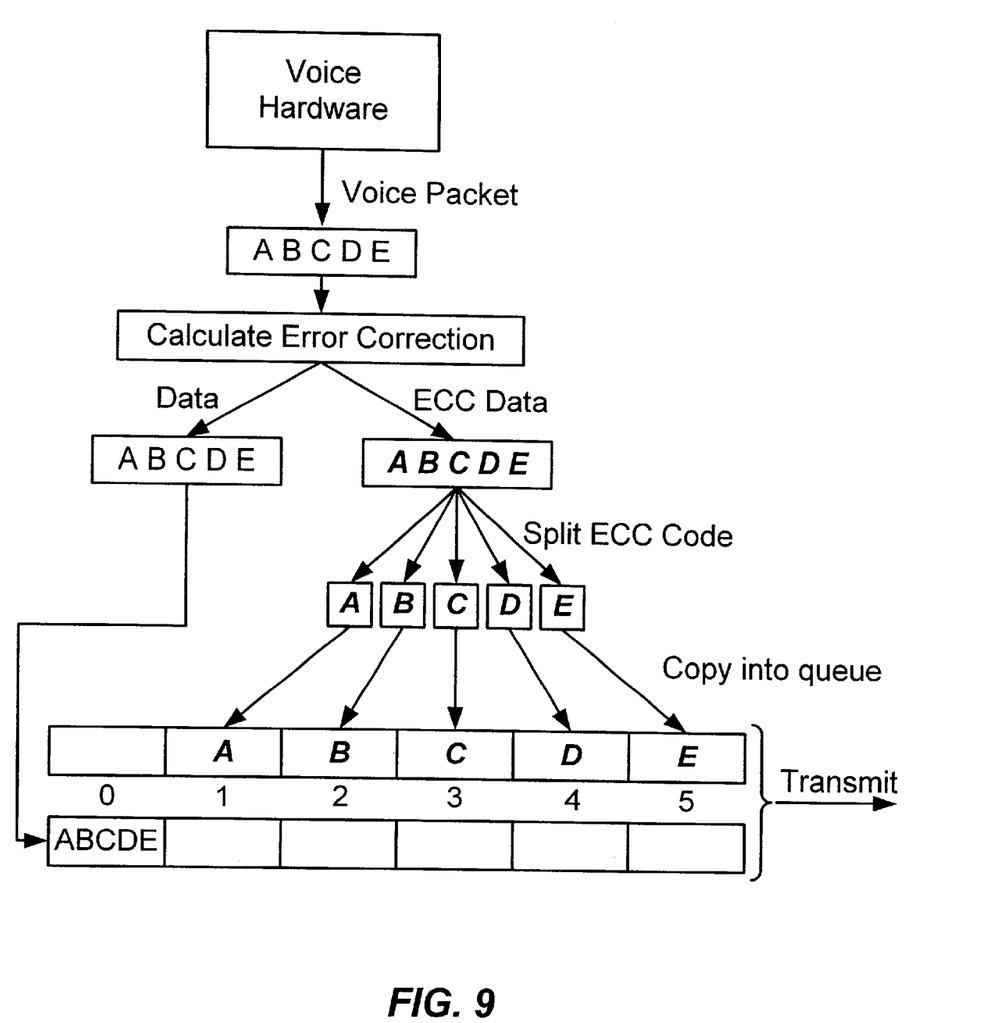
FIG. 9 is a diagram illustrating the construction of a "queue pair" according to the present invention.

As shown in FIG. 9, compressed voice packets are passed up from the voice hardware. ECC (Error Correcting Code) data is then calculated on each packet. The data is appended to the back of "ECC queues". Packets are then transmitted out the front of the queues.

In further detail, the compressed voice packets that are transmitted originate from the DSP hardware. These packets are passed on to a transmission queue. As each packet is received from the hardware, ECC information is calculated and the ECC data is spread over the length of an attached ECC queue. As each packed is processed into the queue, packets from the other side are transmitted, either as two packets (ECC and data packets) or sent onto get "frame packed". Frame packing is described in related U.S. patent application Ser. No. 09/693,782 entitled "SYSTEM AND METHOD FOR FRAME PACKING", filed Oct. 19, 2000, assigned to the assignee of the present application, and herein incorporated by reference.

Figure 10:
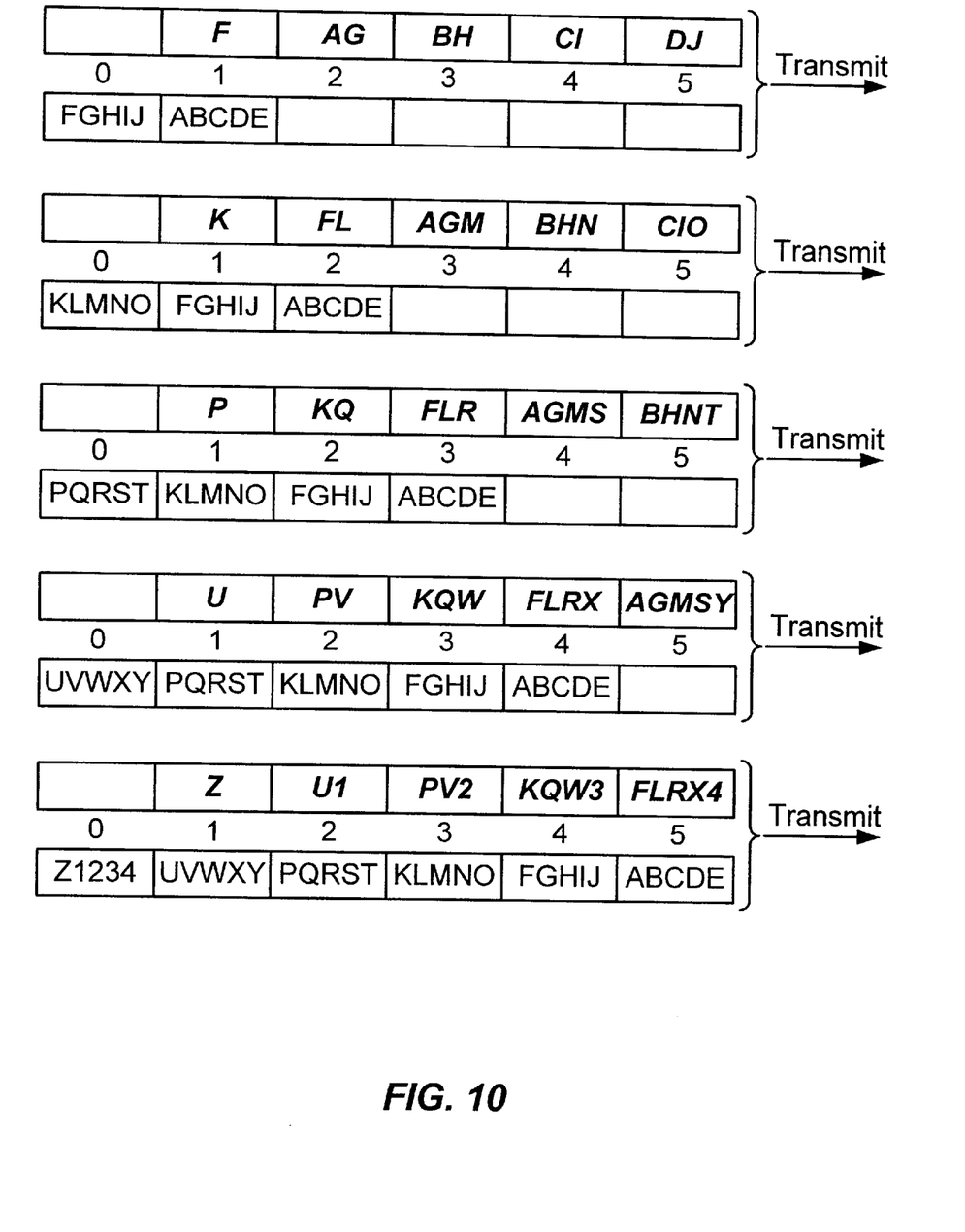
FIG. 10 is a diagram of transmission "queue pairs" constructed according to the present invention.

As seen in the transmission "queue pairs" (ECC queue+ corresponding Data queue) in FIG. 10, ECC data is ready to be transmitted before some of the actual data. In this case, silence is transmitted for the data packets. Each "queue pair" in FIG. 10 represents a new packet arriving and transmitted. (See FIG. 9.)

Note:

Each data packet is transmitted after ALL corresponding ECC data has been transmitted, this is a fundamental in Forward Error Correction.

Each piece of ECC data that is placed across the queues is appended to any existing ECC data.

Transmission latency can be calculated by the size of the queue (in this case 5) multiplied by the sample rate, usually 30 ms, i.e. 5×30=150 ms FIGS. 9 and 10 represent one call. A List of Call queues may be set up for each call.

Receiving FEC

In general, data is received asynchronously and filtered back into ECC queues synchronously (same as in transmission). Packet sequencing is checked and corrections are made (if necessary) to the queue. The ECC queue is then "shunted" along and the packet just received is "copied down" to the voice hardware, i.e. there is no latency involved at the receiving end.

Figure 11:
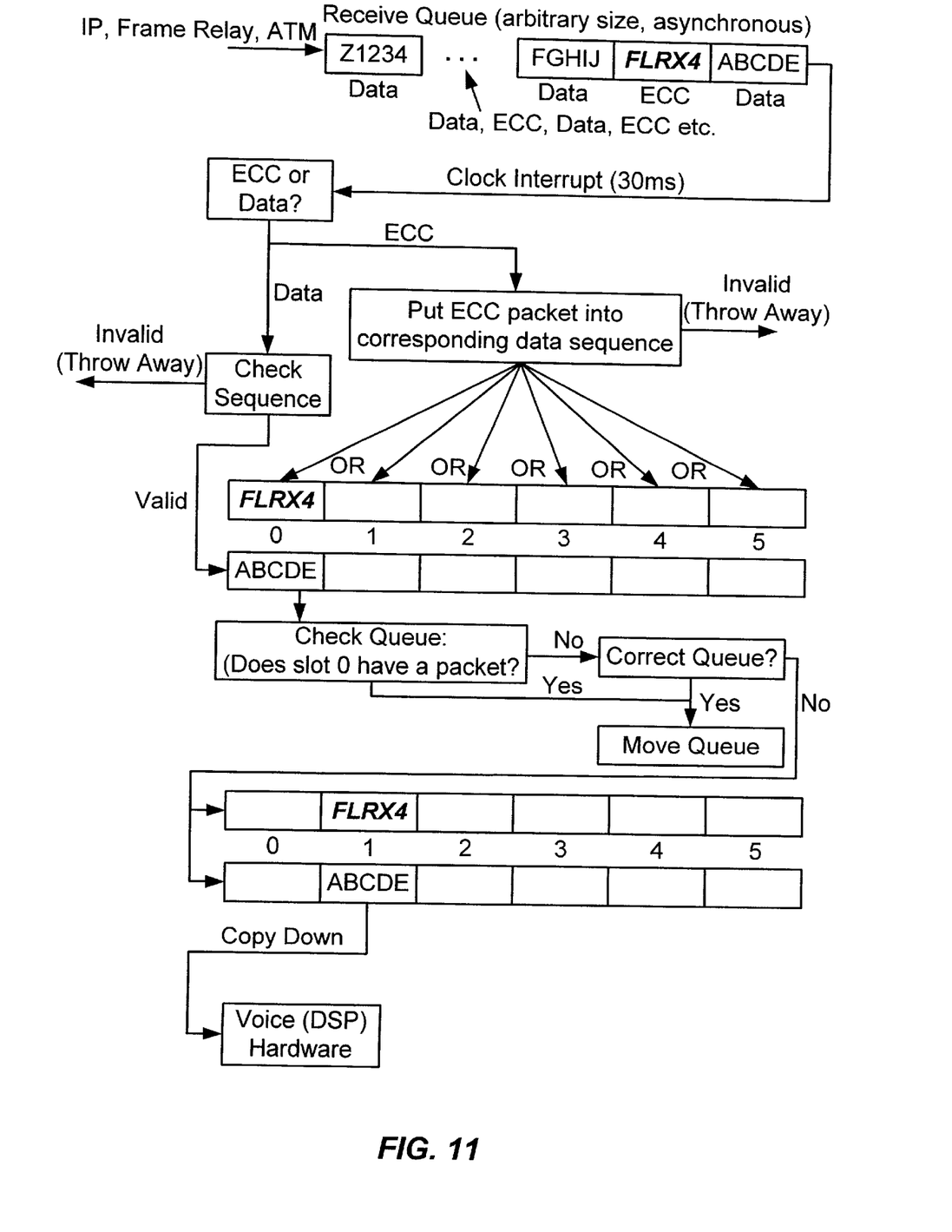
FIG. 11 is a diagram of the operation of the present invention.

The receive processing will now be described in greater detail with reference to FIG. 11.

1. Call data is received from a transport layer (IP, Frame Relay, ATM etc). This data is then pushed onto the end of a FIFO queue, asynchronously. The queue is used as a type of flow control for the synchronous data reception.

2. The queue is then operated every time a clock Interrupt is received for the voice hardware. The Interrupt is taken as an indication that the voice hardware is waiting for another packet.

3. The packet at the front of the queue is removed and checked whether it is an ECC or non-ECC packet.

ECC packets are placed into an ECC queue associated with a particular call. The ECC packet is placed into whichever slot is required to match the corresponding data packet. For example, if the ECC packet sequence is 15, then there probably exists a data packet with a sequence of 15, which then can be matched.

Non-ECC packets have their packet sequence checked relative to the back of the ECC queue, and if valid it is put into the back of the queue.

4. The queue for each call is then checked to see if there is in fact a data packet in slot zero.

If there is a data packet then the queue is moved or "shunted along" one slot. (Packets in slot 5 would get moved off the queue and deleted)

If there is no packet in slot 0 then FEC is used to correct the missing data packet. This is done by reversing the process used to assemble the ECC data on the transmission side, followed by a Reed-Solomon algorithm decode/reconstruction. If the queue is successfully reconstructed, then the queue is moved or "shunted along" one slot.

5. If there is a data packet in slot 1 then it is "copied down" to the voice hardware for further processing.

Important points to note:

ECC packets are placed into an ECC queue for a particular call. An ECC packet is placed into whichever slot is required to match the corresponding data packet. For example, if the ECC packet sequence is 15, then there probably exists a data packet with a sequence of 15, which then can be matched. This operation is performed because if a data packet is late, FEC reconstructs that data packet (NOT the corresponding ECC packet as well). So when or if the data/ECC pair of packets does arrive, the present invention can still use the ECC data.

Some voice compression CODECs have different sample rates—usually 30 ms, but sometimes 10 ms or 15 ms as well. To maintain a synchronous receiver, the voice hardware needs to support the different clock rate interrupts. Otherwise, a 30 ms clock rate is used and steps 3–5 are operated on 1, 2 or 3 times in one clock interrupt.

As noted above, the present forward error correction (FEC) scheme may be combined with the frame packing method disclosed in the related application "SYSTEM AND METHOD FOR FRAME PACKING", herein incorporated by reference. The voice data frames at a same time interval, but from different conversations, can be combined into one packet, and the corresponding error frames combined into a second packet. This greatly reduces the latency associated with sending the error packets, and reduces the overhead associated with prior art Reed-Solomon solutions.

One of the trade-offs with doing the FEC is that since the error packets are transmitted several packets before the corresponding data packets, an overall latency is induced (from the transmission side) in order to determine if the current voice packets arrive. However, for public IP links, as illustrated by the network of FIG. 1, an additional 100 ms or so of delay is not that noticeable.

According to prior art Reed-Solomon approaches, the voice data and error correction data would be placed in the same packet and the system would be useless, since if the packet is lost, there is no way to use the lost error data to recreate the voice data. Thus, the present invention places error data in a separate packet, and transmits the error packet within a predefined number of packets of the corresponding data packet. The present invention thus greatly reduces overhead and thereby improves system performance.

Figure 12:
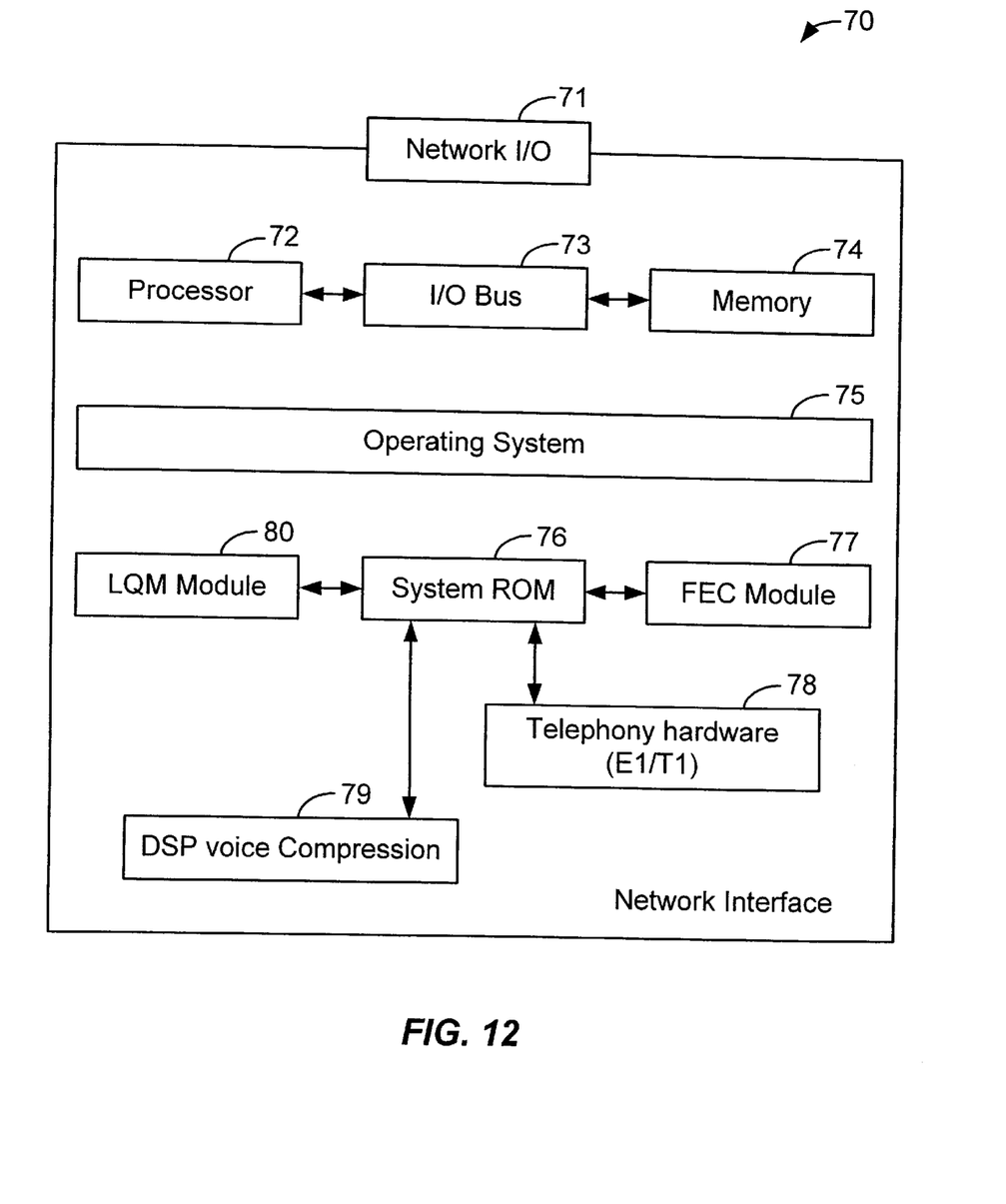
FIG. 12 is a block diagram of a network interface incorporating the present invention.

FIG. 12 is a block diagram of a network interface 70 incorporating the present invention. A network I/O module 71 connects the interface 70 to an external network. The interface 70 includes a processor 72, an I/O bus 73, and a memory 74 for processing the call packets. The network interface 70 has an internal operating system 75 to control the internal operation of the interface. An internal system ROM 76 stores the operative control code for the interface. The network interface further includes telephony hardware interface 78 for connecting to telephone equipment, and also includes a DSP voice compression module 79. A Forward Error Correction (FEC) module 77 for provides error correction services according to the present invention.

The teachings of the present invention may be further enhanced by dynamically adapting the amount of error correction that is sent based upon the "reliability" of a network connection. For example, a link quality management module 80 can monitor various links available by sending "ping" type requests, or "echo requests" to known network nodes. When each foreign node receives an "echo request", it responds to the sender by sending an "echo reply". The sending node notes how many responses it gets, and how long each takes to return. These two statistics are maintained as "average loss" and "average round trip delay".

Figure 13:
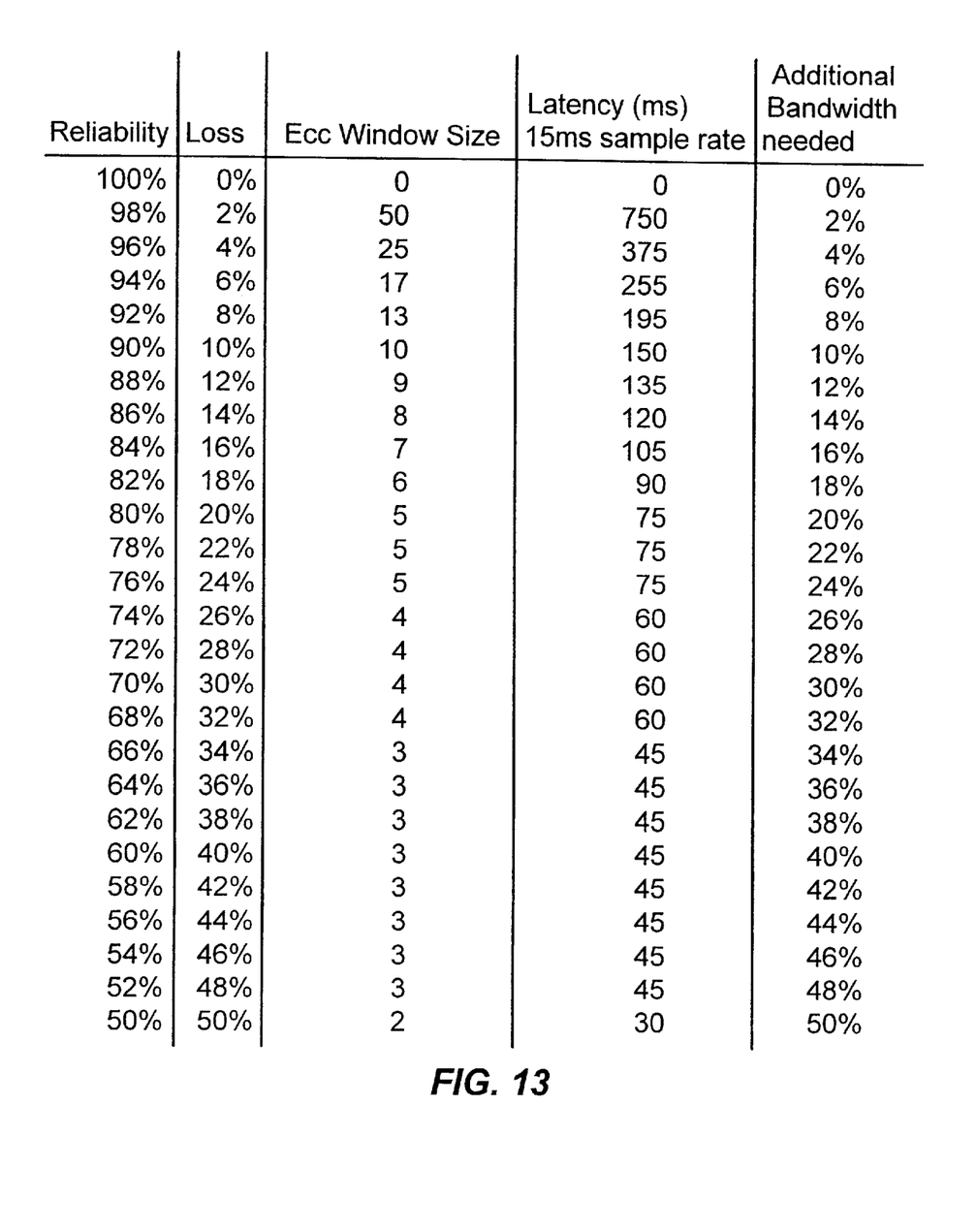
FIG. 13 is a table showing ratios of Ecc window size, latency and bandwidth to compensate for a specific reliability measure.

The "average loss" statistic is the most important measure for error correction. If a link is determined to be 100% reliable, then there is no need to transmit any error correction. If the link is only somewhat unreliable (i.e. 95%), then a much smaller amount of error correction data can be transmitted. This in turn helps to reduce latency and bandwidth requirements for reliable links. In practice, for any loss less than 10%, it is more efficient to assume a 10% loss in order to reduce latency, as shown by the data table of FIG. 13, where Ecc is "Error Checking and Correction."

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for transmitting data packets in a network, the method comprising:
   creating a data packet;
   creating separate error correction data corresponding to the data packet; and
   transmitting the separate error correction data a predefined number of packets before the data packet.

2. The method of claim 1, wherein the separate error correction data comprises one packet.

3. The method of claim 2, wherein the separate error correction data comprises at least two packets.

4. The method of claim 3, wherein creating separate error correction data comprises creating a forward error correction (FEC) packet utilizing a Reed-Solomon algorithm.

5. The method of claim 4, wherein the separate error correction packet is transmitted at least one packet before the data packet.

6. The method of claim 5, wherein the network is an Internet Protocol (IP) network and a data packet comprises a voice data packet.

7. The method of claim 6, wherein a receiving end buffers a sufficient number of packets to determine whether an error packet has been received for a corresponding missing or corrupted voice packet.

8. The method of claim 7, wherein voice frames from different conversations at a same time interval are packed into a common packet.

9. The method of claim 8, wherein error frames from different conversations at a same time interval are packed into a common packet, the packed error frames corresponding to the packed voice frames.

10. The method of claim 1, wherein an amount of error correction that is sent is based upon a link quality measure.

11. A communications system comprising:
    at least one source node and at least one destination node; and
    a packetized data network connection the nodes;
    wherein the source node sends data packets over the network, and sends at least one error data packet corresponding to each data packet a predetermined number of packets before the data packet.

12. The communications system of claim 11, wherein the error data packets contain forward error correction (FEC) data.

13. The communications system of claim 12, wherein the forward error correction (FEC) data is produced from a Reed-Solomon algorithm.

14. The communications system of claim 13, wherein the destination node buffers a sufficient number of packets to determine whether an error packet has been received from a corresponding missing or corrupted data packet.

15. The communications system of claim 14, wherein the data packet comprises a voice data packet.

16. The communications system of claim 15, wherein voice frames from different conversations at a same time interval are packed into a common packet.

17. The communications system of claim 16, wherein error frames from different conversations at a same time interval are packed into a common packet, the packed error frames corresponding to the packed voice frames.

18. A method for transmitting voice data over a network using Internet Protocol (IP), the method comprising:
    creating a voice data packet;
    creating at least one separate error correction data packet corresponding to the voice data packet, the error correction data packet containing forward error correction (FEC) data;
    transmitting the at least one separate error correction data packet a predefined number of packets before the voice data packet;
    buffering a sufficient number of packets at a receiving end to determine whether an error packet has been received for a corresponding missing or corrupted voice packet; and using a received error packet to recreate a missing or corrupted voice packet.

19. The method of claim 18, wherein the forward error correction (FEC) data is created using a Reed-Solomon algorithm.

20. The method of claim 19, wherein voice frames from different conversations at a same time interval are packed into a common packet.

21. The method of claim 20, wherein error frames from different conversations at a same time interval are packed into a common packet, the packed error frames corresponding to the packed voice frames.

22. The method of claim 18, further comprising:
determining a reliability measure of a link; and
sending a level of error correction data based upon the reliability measure.

23. A network interface comprising:
a processor;
a memory connected to the processor;
a system ROM that stored control code connected to the processor; and
a Forward Error Correction Module;
wherein the Forward Error Correction Module stores execution code for the processor, the execution code comprising:
execution code for creating a data packet;
execution code for creating separate correction data corresponding to the data packet; and
execution code for transmitting the separate error correction data a predefined number of packets before the data packet.

24. The network interface of claim 23 further comprising a link quality management module.

* * * * *